Patented Sept. 21, 1954

2,689,828

UNITED STATES PATENT OFFICE 2,689,828

MINERAL OIL COMPOSITIONS

Herschel G. Smith, Wallingford, and Troy L. Cantrell, Lansdowne, Pa., and John G. Peters, Audubon, N. J., assignors to Gulf Oil Corporation, Pittsburgh, Pa., a corporation of Pennsylvania No Drawing. Application June 4, 1952,
Serial No. 291,788

15 Claims. (Cl. 252—34)

This invention relates to improvements in mineral oil compositions, and more particularly to improved mineral oil compositions which comprise a major amount of a mineral oil and a minor amount of an improvement agent which confers thereupon several useful and advantageous properties such as the prevention of rust, corrosion and wear.

Inasmuch as ordinary, uncompounded mineral oils usually are deficient in one or more respects for certain commercial uses, it is common practice to incorporate in the oil one or more "additive" compounds in order to overcome the defect or defects thereof. In addition, various agents, known as "improvement" or "addition" agents have been incorporated in oils to improve certain of their operations for particular or special uses requiring a superior oil. For example in the lubrication of steam turbines, particularly those used in marine operation, uncompounded mineral oil lubricants normally prove unsatisfactory in service because of the corrosion and rusting of metal parts in contact therewith.

An object of this invention, therefore, is to provide mineral oil compositions having improved rust and corrosion-inhibiting properties.

Another object of this invention is to provide improvement agents which, when incorporated in mineral oils and mineral oil composition will impart thereto rust-inhibiting properties.

These and other objects are accomplished by the present invention which provides new mineral oil compositions containing a major amount of a mineral oil and a minor amount, sufficient to confer corrosion-inhibiting properties on the composition, of an amine salt of an aliphatic half ester of a dicarboxylic acid, wherein the acid is selected from the group consisting of phthalic and alkyl substituted phthalic acids, and the aliphatic residue of the ester contains at least 8 carbon atoms.

Our improvement agents may be conveniently prepared from equimolar proportions of: (1) phthalic acid, an alkyl substituted phthalic acid, or their anhydrides, the anhydrides being preferred; (2) a saturated or unsaturated monohydric aliphatic alcohol having at least 8 carbon atoms; and (3) a primary, secondary, or tertiary amine. It is desirable to form the half ester first by reacting the phthalic acid or anhydride with the alcohol. Thereafter the amine is added to form the amino salt of the half ester. These are conventional reactions and may be carried out according to conventional procedures. Ordinarily, an elevated temperature of about 275° F. is used for the esterification reaction in connection with acid anhydrides; higher temperatures are normally desirable in connection with esterification of the acids themselves. In forming the amino salt of the half ester, the reaction proceeds at room temperature, but slightly elevated temperatures, say 130° F., are preferably employed.

In preparing our new mineral oil compositions, the amino salt of the half ester of phthalic acid can be incorporated in the desired mineral oil in the proper proportions merely by mixing the additive in with the oil. If desired, however, the reaction product may be prepared in situ in the mineral oil. For example, where our additive compounds are to be used in mineral oils, such as motor oils, turbine oils, diesel fuel oils, light naphthas and the like, it is highly advantageous to prepare the compound in situ in the oil in which it is to be used. In this manner, concentrated solutions of the compounds may be prepared which can be diluted down with the same or another mineral oil to the concentration desired in the final product.

The acidic agents used in preparing our new compounds are either phthalic or alkyl substituted phthalic acids or their anhydrides. Any alkyl substituted phthalic acid or anhydride can be used, i. e., mono- or di-alkyl substituted phthalic acids or anhydrides wherein the alkyl group is methyl, ethyl, propyl, butyl, hexyl, octyl, etc. As stated, acid anhydrides are preferred in view of the lower temperatures at which they may be esterified. Such low temperatures minimize side reactions and decomposition of reactants and/or products.

For preparing the half ester, a wide variety of monohydric aliphatic alcohols having at least 8 carbon atoms can be employed. In general, alcohols having from 8 to 22 carbon atoms are preferred in consideration of their commercial availability and/or low cost. Examples of these alcohols include saturated alcohols such as n- octyl, 2-ethyl-hexyl, monyl, decyl, undecyl, dodecyl (lauryl), tetradecyl (myristyl), hexadecyl (cetyl), octa-decyl (stearyl), eicosyl, and docosyl alcohols. Furthermore, mixtures of the above alcohols can also be used. The mixture of alcohols obtained by the reduction of higher fatty acids, such as "Lorol" (a mixture of aliphatic alcohols formed by reduction of coconut oil fatty acids), sperm oil alcohols, obtained by the saponification of sperm oil and comprising principally cetyl alcohol, and the mixture of alcohols (principally cholesterol) obtained by the saponification of wool fat or lanolin are also suitable. Examples of unsaturated alcohols which are suitable are octenyl, citronellol, decenyl, undecenyl, dodecenyl, tetradecenyl, hexadecenyl, oleyl alcohol, phytol, and erucyl alcohol. Other suitable alcohols include sulfurized oleyl alcohol and halogen containing alcohols such as 10-bromodecanol-1, etc. Preferred alcohols include 2-ethylhexanol, sperm oil alcohols and oleyl alcohol.

The amines employed in preparing the amino salt of the half ester of phthalic acid are primary, secondary and tertiary, aliphatic (including cycloaliphatic), aromatic and heterocyclic.

Thus, any amine can be employed in preparing the amino salts of the half esters of phthalic or alkyl phthalic acids described. As examples of such amines, there are included aliphatic and cycloaliphatic amines such as methylamine, ethylamine, diethylamine, amylamine, tributylamine, ethanolamine, diethanolamine, triethanolamine, isopropanolamine, trimethylamine, laurylamine, hexadecylamine, ethylene diamine, diethylenetriamine, triethylene-tetramine, cyclohexylamine, dicyclohexylamine, tristearylamine, guanidine, dodecenyl amine, oleyl amine, morpholine, eicosenyl amine, N-oleyl, N-propanol amine, N-dodecyl, N-ethanol amine, etc. Mixtures of amines may also be employed, particularly the mixtures of amines obtained by converting the higher fatty acids into the corresponding amine. One such mixture is cocoamine obtained from coconut oil fatty acids which contains mostly lauryl amine and homologous amines. As stated aromatic amines such as aniline and diphenyl aniline, and triphenyl aniline are also suitable. Mixed amines such as monomethyl aniline, methyl cyclohexyl amine, and the like also may be used. It is distinctly preferred that at least one substituent of the amine employed have at least 6 and preferably from 6 to 22 carbon atoms.

The following examples show the preparation of the amino salts of the half esters described. Unless otherwise indicated, all parts are by weight.

*Example I*

An amino salt of a half ester of phthalic acid was prepared by first esterifying at 275° F. 30 parts by weight of the anhydride of o-phthalic acid and 50 parts by weight of sperm oil alcohols. When the formation of the half ester (after approximately one-half hour) was complete, the mixture was cooled to 130° F. and 20 parts by weight of cyclohexylamine were added. The product obtained was the cyclohexylamine salt of the sperm oil alcohols half ester of phthalic acid.

*Example II*

Another salt of a half ester of phthalic acid was prepared by first esterifying at 275° F. 30 parts by weight of the anhydride of o-phthalic acid and 26 parts of an octyl alcohol (2-ethylhexanol). When the esterification reaction was complete (after approximately one-half hour) the mixture was cooled to 130° F. and 36 parts by weight of dicyclohexylamine were added. The product obtained was the dicyclohexylamine salt of 2-ethyl-hexyl acid phthalate.

There were similarly prepared the cocoamine salts of 2-ethylhexyl acid phthalate and oleyl acid phthalate, respectively.

The above described amino salts are readily miscible with various mineral oils and oil compositions, and are quite soluble in mineral oils. The amino salts are useful and advantageous as additive compounds in preparing improved motor oils, diesel oils, turbine oils and similar lubricants. They are also advantageous in preparing other improved compositions, useful in protecting metals against abrasion and corrosion.

In general, in preparing our improved mineral oil compositions, the amino salts are dissolved in the selected mineral oil base in an amount sufficient to confer corrosion-inhibiting properties on the composition. Usually, such mineral oil compositions will contain from 0.01 to 1.0 per cent by weight of the salt. However, larger or smaller percentages may be used to advantage.

*Example III*

As an example of an improved mineral lubricating oil composition prepared in accordance with our invention, an aluminum chloride treated lubricating oil stock having a viscosity of 150 S. U. S. at 100° F. was blended with 0.12 per cent by weight of the cyclohexylamine salt of the sperm oil alcohols half ester of phthalic acid prepared according to Example I. Comparison tests of the unimproved oil and the improved oil follow:

|  | Unimproved Oil | Improved Oil |
| --- | --- | --- |
| Gravity, ° API | 31.5 | 31.5. |
| Viscosity, SUV: |  |  |
| 100° F | 153.3 | 152.3. |
| 210 | 43.9 | 43.9. |
| Viscosity Index | 108 | 109. |
| Corrosion Test, ASTM D665-47T: |  |  |
| Distilled Water— |  |  |
| Steel Rod, Appearance | rusted | bright. |
| Area Rusted, Percent | 100 | 0. |
| Synthetic Sea Water— |  |  |
| Steel Rod, Appearance | rusted | bright. |
| Area Rusted, Percent | 100 | 0. |
| Neutralization No | 0.02 | 0.12. |

The novel mineral oil compositions of this invention not only possess enhanced corrosion inhibiting properties, but in addition they possess substantially improved lubricating qualities as evidenced by the following example:

*Example IV*

The composition of Example III was subjected to the Falex wear test. The following results were obtained:

| Falex Wear Test | Unimproved Oil | Improved Oil |
| --- | --- | --- |
| 500 Lb. gauge Load, 15 min.—Room Temperature at Start of Test: |  |  |
| Wear, No. of Teeth | 0 | 0 |
| Gauge Load at Seizure, Lbs | 900 | 1,300 |

Example V

Similarly, as in Example III, an aluminum chloride treated lubricating oil stock having a viscosity of 150 S. U. S. at 100° F. was blended with 0.12 per cent by weight of the dicyclohexylamine salt of the octyl acid phthalate prepared according to Example II. A comparison of the unimproved oil and the improved oil follows:

|  | Unimproved Oil | Improved Oil |
|---|---|---|
| Gravity, ° API | 31.5 | 31.5. |
| Viscosity, SUV: |  |  |
| 100° F | 153.3 | 153.9. |
| 210 | 43.9 | 44.0. |
| Viscosity Index | 108 | 109. |
| Corrosion Test, ASTM D665-47T: |  |  |
| Distilled Water— |  |  |
| Steel Rod, Appearance | rusted | bright. |
| Area Rusted, Percent | 100 | 0. |
| Synthetic Sea Water— |  |  |
| Steel Rod, Appearance | rusted | bright. |
| Area Rusted, Percent | 100 | 0. |
| Neutralization No | 0.02 | 0.14. |

Example VI

The same lubricating oil stock of Example III was blended with 0.12 per cent by weight of the cocoamine salt of 2-ethylhexyl acid phthalate. A comparison of the unimproved and improved oil showed:

|  | Unimproved Oil | Improved Oil |
|---|---|---|
| Gravity, ° API | 31.5 | 31.5. |
| Viscosity, SUV: |  |  |
| 100° F | 153.3 | 152.7. |
| 210 | 43.9 | 43.9. |
| Viscosity Index | 108 | 109. |
| Corrosion Test, ASTM D665-47T: |  |  |
| Distilled Water— |  |  |
| Steel Rod, Appearance | rusted | bright. |
| Area Rusted, Percent | 100 | 0. |
| Synthetic Sea Water— |  |  |
| Steel Rod, Appearance | rusted | bright. |
| Area Rusted, Percent | 100 | 0. |
| Neutralization No | 0.02 | 0.14. |

Example VII

A turbine oil base was treated with 0.2 per cent by weight of the cocoamine salt of oleyl acid phthalate. A comparison of the unimproved and the improved oil follows:

|  | Unimproved Oil | Improved Oil |
|---|---|---|
| Gravity, ° API | 28.5 | 28.6. |
| Corrosion Test, ASTM D665-47T: |  |  |
| Distilled Water— |  |  |
| Steel Rod, Appearance | rusted | bright. |
| Area Rusted, Percent | 100 | 0. |
| Synthetic Sea Water— |  |  |
| Steel Rod, Appearance | rusted | bright. |
| Area Rusted, Percent | 100 | 0. |

It is apparent from the preceding examples that the improved oils of this invention have markedly enhanced rust-preventive qualities, whereas the unimproved oils give little or no protection against rusting.

In addition to improved mineral lubricating oils, other valuable mineral oil compositions can be prepared employing the above described amino salts.

The following examples are illustrative of the benefits obtained in connection with a fuel oil containing an addition agent of the type described.

Example VIII

A sample of a furnace oil containing 0.01 per cent by weight of the cyclohexylamine salt of the half ester of phthalic acid and sperm oil alcohols, prepared according to the method of Example I, was compared with a sample of the untreated furnace oil for oxidation and ultraviolet light stability. The following data indicate the results obtained:

|  | Uninhibited No. 2 Fuel Oil | Inhibited Fuel Oil |
|---|---|---|
| Make-up No. 2 Fuel Oil, percent by Wt.: |  |  |
| Uncracked Distillate | 75 | 75. |
| Catalytic Cracked Distillates | 25 | 25. |
| Additive, Lb./1000 Bbl |  | 30 (0.01 percent by weight). |
| Inspection: |  |  |
| Gravity, ° API | 33.8 |  |
| Viscosity, SUV, 100° F | 35.8 |  |
| Color, NPA | 1.75 |  |
| Neutralization No | 0.06 |  |
| Carbon Residue on 10% Bottoms | 0.09 |  |
| Oxidation Test: |  |  |
| Method 327, Gulf Mod.—300° F., 3 L. Oxygen/Hr., 2 Hr., 300 Cc.— |  |  |
| Color, NPA, Unfiltered | dark | 4.5. |
| Color, NPA, Filtered | 7.5 | 4.25. |
| Insoluble: Mg./300 Cc. | 98 | 35. |
| Ultraviolet Light Stability: |  |  |
| Method 332, Gulf Mod.—Quartz Tube, 111° F., 24 Hr.— |  |  |
| Color, NPA | 5.5 | 4.5. |
| Appearance | hvy. ppt. | mod. ppt. |

Example IX

The composition of Example VIII was further tested for corrosion inhibiting properties. The results of this test are reported below:

|  | Unimproved Oil | Improved Oil |
|---|---|---|
| Corrosion Test, ASTM D665-47T: |  |  |
| Distilled Water— |  |  |
| Steel Rod, Appearance | rusted | bright. |
| Area Rusted, Percent | 100 | 0. |
| Synthetic Sea Water— |  |  |
| Steel Rod, Appearance | rusted | bright. |
| Area Rusted, Percent | 100 | 0. |

Thus, the salts can be added in minor amounts to fuel oils, such as gasoline and diesel fuel oils. The resulting diesel fuel compositions, in addition to having corrosion-inhibiting properties, show other valuable properties such as reduced ring-sticking, reduced gum formation and reduced wear in diesel engines burning said composition. Furthermore, mineral oil compositions containing our new compounds are excellent coating compositions for metals, and effectively protect both ferrous and non-ferrous metals from corrosion, even when in contact with aqueous liquids or when subjected to other drastic service conditions. Accordingly, a wide range of protective coating compositions for metals can be prepared by the present invention. For instance, our new improvement agents can be dissolved in volatile mineral oils, such as light naphthas, including kerosene and Stoddard solvent, to obtain protective coating compositions for metals which can be applied by brushing, dipping or spraying. After evaporation of the light naphtha, the metal becomes coated with a tightly adherent protective film which is substantially impervious to water and aqueous solutions. Furthermore, our improvement agents can be dissolved in substantially non-volatile mineral oils to obtain still other excellent protective coating compositions for metals, such as slushing oils. This variety of uses makes our new compositions valuable in lubricating, coating and related arts.

Other known improvement or additive agents may be incorporated in the mineral oil compositions described without departing from the spirit of this invention. For example, pour point depressants, viscosity index improvers, soaps, antioxidants, coloring agents, extreme pressure agents, etc. may be employed to confer their desired effects.

The Falex lubricant testing machine employed in the tests of Example IV is essentially a device in which a small round standard pin is rotated between two standard alloy V-shaped bearing blocks. Suitable means for applying pressure to the blocks (thus putting pressure on the bearing surface) is provided by a large ratchet wheel which can be turned one tooth at a time up to the desired load.

The Falex wear test is conducted as follows: About 55 cc. of the lubricant to be tested is placed in an adjustable cup which is then raised so that the pin and V-blocks are completely immersed in the oil. The pin is started rotating at 290 R. P. M. and the ratchet wheel is turned up until a force of 50 pounds on the bearing surface is indicated on a suitable gauge. Under these conditions, a break-in run of ½ hour is made. After the ½ hour break-in period, the ratchet wheel is further turned up until the bearing load is 100 pounds and the position of an index tooth of the ratchet wheel, relative to any fixed point near the periphery of the wheel, is noted. The test is continued for three more hours under these conditions, the load being held constant at 100 pounds by adjustment (turning up) of the ratchet wheel as the bearing surfaces are worn down. At the end of this three-hour period the test is stopped. The number of teeth which have been turned past the fixed reference point near the periphery of the ratchet wheel indicates the amount of wear that has occurred. The results of the test are reported as the "number of teeth," e. g. "5 teeth," "10 teeth," etc.

The Falex seizure test is run in the same machine, using the same amount of oil to surround the V-blocks and rotating pin as is used for the Falex wear test. Likewise the same speed of 290 R. P. M. is employed for the rotating pin. In the Falex seizure test a break-in period of ten minutes at a bearing load of 250 pounds is employed. At the end of the ten minutes break-in period at 250 pounds the bearing pressure is increased to 300 pounds and in regular 100 pound increments every three minutes thereafter until the pin "seizes" or until a maximum load of 2500 pounds is achieved. The "seize-point" is characterized by a sudden large increase of torque which can be seen on a torque indicator which is operated in conjunction with the rotating pin. The test result is expressed as the bearing load at which seizure occurs.

Test method 327, Gulf Mod. is carried out to determine the sludge formed (per cent insoluble in benzene) in fuel or furnace oils subjected to oxidizing conditions at 300° F. Briefly, according to this test, a measured sample of the oil is placed in a Kjeldahl type flask at room temperature. An air-cooled condenser is attached to the flask through a cork stopper. A length of glass tubing is inserted through the condenser into the bottom of the flask. The assembly is placed in an oil bath maintained at 300° F.±1° F. and commercial grade oxygen is passed into the glass tube and through the oil at a constant measured rate.

The oxidation is continued for two hours, after which the flask is removed from the oil bath and allowed to cool. After cooling, the contents of the flask are stirred; the flask is then stoppered and shaken vigorously for 30 seconds. The contents of the flask, or a measured portion thereof, are removed and poured into a centrifuge tube containing an equal volume of 90 per cent benzene. Solution is facilitated by shaking. The mixture is centrifuged for 30 minutes as prescribed by ASTM method D96-35. The volume in cc. of solid sediment at the bottom of the tube is read and recorded.

Method 332, Gulf Mod. referred to in Example VIII is described fully in U. S. patent application Serial No. 181,936, filed August 28, 1950, now U. S. Patent No. 2,656,259 in the names of Smith, Cantrell, and Peters.

Resort may be had to such modifications and variations as fall within the spirit of the invention and the scope of the appended claims.

We claim:

1. A mineral oil composition comprising a major amount of a mineral oil and a minor amount, sufficient to confer corrosion-inhibiting properties on the composition, of an amine salt of an aliphatic half ester of an acid selected from the group consisting of phthalic and alkyl substituted phthalic acids, the aliphatic residue of said ester containing at least 8 carbon atoms.

2. The composition of claim 1, wherein the mineral oil is a fuel oil.

3. The composition of claim 1, wherein the mineral oil is a lubricating oil.

4. The composition of claim 1, wherein the mineral oil is a light naphtha.

5. The composition of claim 1, wherein the amine salt is present in an amount of from about 0.01 to about 1.0 per cent by weight of the composition.

6. A lubricant composition comprising a major amount of a mineral lubricating oil and a minor amount, sufficient to confer corrosion inhibiting properties on the composition, of an amine salt of a half ester of phthalic acid, the aliphatic residue of said ester containing at least 8 carbon atoms.

7. A lubricant composition in accordance with claim 6, wherein the salt is the cyclohexylamine salt of the sperm oil alcohols half ester of phthalic acid.

8. A lubricant composition in accordance with claim 6, wherein the salt is the dicyclohexylamine salt of 2-ethyl-hexyl acid phthalate.

9. A lubricant composition in accordance with claim 6, wherein the salt is the cocoamine salt of 2-ethyl-hexyl acid phthalate.

10. A lubricant composition in accordance with claim 6, wherein the salt is the cocoamine salt of oleyl acid phthalate.

11. A fuel oil composition comprising a major amount of a mineral fuel oil and a minor amount, sufficient to confer corrosion inhibiting properties on the composition, of an amine salt of a half ester of phthalic acid, the aliphatic residue of said ester containing at least 8 carbon atoms.

12. The composition of claim 11, wherein the salt is the cyclohexylamine salt of the sperm oil alcohols half ester of phthalic acid.

13. The composition of claim 11, wherein the salt is the dicyclohexylamine salt of 2-ethyl-hexyl acid phthalate.

14. The composition of claim 11, wherein the salt is the cocoamine salt of 2-ethyl-hexyl acid phthalate.

15. The composition of claim 11, wherein the salt is the cocoamine salt of oleyl acid phthalate.

References Cited in the file of this patent

UNITED STATES PATENTS

| Number | Name | Date |
|---|---|---|
| 1,803,298 | Bannister | Apr. 28, 1931 |
| 2,134,959 | Sibley | Nov. 1, 1938 |
| 2,344,016 | Anderson | Mar. 14, 1944 |
| 2,372,955 | Johnston | Apr. 3, 1945 |
| 2,401,993 | Wasson | June 11, 1946 |
| 2,426,496 | Farley | Aug. 26, 1947 |